United States Patent
Zarifi et al.

(10) Patent No.: US 10,834,700 B2
(45) Date of Patent: *Nov. 10, 2020

(54) PAGING MECHANISM FOR WIRELESS NETWORKS

(71) Applicants: Keyvan Zarifi, Ottawa (CA); Mohammadhadi Baligh, Ottawa (CA)

(72) Inventors: Keyvan Zarifi, Ottawa (CA); Mohammadhadi Baligh, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/505,029

(22) Filed: Jul. 8, 2019

(65) Prior Publication Data

US 2019/0335419 A1  Oct. 31, 2019

Related U.S. Application Data

(63) Continuation of application No. 15/705,998, filed on Sep. 15, 2017, now Pat. No. 10,356,750, which is a continuation of application No. 14/985,991, filed on Dec. 31, 2015, now Pat. No. 9,769,793.

(51) Int. Cl.
*H04W 68/02* (2009.01)
*H04W 76/11* (2018.01)

(52) U.S. Cl.
CPC ........ *H04W 68/02* (2013.01); *H04W 76/11* (2018.02)

(58) Field of Classification Search
CPC .................................................. H04W 68/02
USPC ........................................................ 455/458
See application file for complete search history.

(56) References Cited

U.S. PATENT DOCUMENTS

| | | | |
|---|---|---|---|
| 6,477,382 B1 | 11/2002 | Mansfield et al. | |
| 7,120,453 B2 | 10/2006 | La Porta et al. | |
| 2002/0046287 A1 | 4/2002 | La Porta et al. | |
| 2007/0105567 A1 | 5/2007 | Mohanty et al. | |
| 2009/0252125 A1* | 10/2009 | Vujcic | H04W 56/0045 370/336 |
| 2015/0244816 A1* | 8/2015 | Pagani | H04W 36/245 370/329 |

FOREIGN PATENT DOCUMENTS

| | | |
|---|---|---|
| CN | 101009927 A | 8/2007 |
| CN | 101415147 A | 4/2009 |
| CN | 102821467 A | 12/2012 |
| CN | 105050182 A | 11/2015 |
| WO | 2009052733 A1 | 4/2009 |
| WO | 2014005956 A1 | 1/2014 |

* cited by examiner

*Primary Examiner* — Joel Ajayi

(57) ABSTRACT

Methods, apparatuses and systems are described. A device, in the active state, receives, from a serving transmission point, a device connection identifier (DCID) associated with the device. The device, in the standby state, periodically transmits, to the same or different serving transmission point, an identifying signal that identifies the first device using the DCID, to synchronize the first device with a wireless communications network.

19 Claims, 8 Drawing Sheets

PAGING MECHANISM FOR WIRELESS NETWORKS

CROSS-REFERENCE TO RELATED APPLICATIONS

The present disclosure is a continuation of U.S. patent application Ser. No. 15/705,998, filed Sep. 15, 2017, entitled "PACING MECHANISM FOR WIRELESS NETWORKS", which is a continuation of U.S. Pat. No. 9,769,793, filed Dec. 31, 2015, entitled "PAGING MECHANISM FOR WIRELESS NETWORKS", the entireties of which are all hereby incorporated by reference.

TECHNICAL FIELD

The present invention relates to wireless communications, and, in particular embodiments, to a system and method for paging a device in a wireless communications network.

BACKGROUND

In current Long Term Evolution networks, a device may be assigned an identifier which is used by the network to send data to the device, while the device has a logical connection established with a particular base station or network node. The assigned identifier is temporary and its use is discontinued after the device has completed communications and entered a standby or idle mode of operation. If the network subsequently has data to send to the device, a paging mechanism is used to contact the device prior to sending data. The paging mechanism increases overhead in the network, particularly when the paging message is transmitted from multiple base stations within the known tracking area for the device. Paging messages may include a lengthy identifier associated with the device such as an International Mobile Equipment Identity (IMEI) or International Mobile Subscriber Identity (IMSI). A series of messages must also be exchanged in order for the device to re-establish a connection with a base station.

SUMMARY

In some example aspects, the present disclosure describes a method performed by a first device. The method includes: receiving, from a serving transmission point, a device connection identifier (DCID) associated with the first device in an active state; and in a standby state: periodically transmitting, to the same or different serving transmission point, an identifying signal that identifies the first device using the DCID, to synchronize the first device with a wireless communications network.

In any of the examples, the method may also include: receiving, by the first device in the standby state, synchronization information; and synchronizing with the wireless communications network using the synchronization information.

In any of the examples, the DCID assigned to the first device in the active state may be retained by the first device in the standby state, and may be further retained by the first device in other operational states.

In any of the examples, the identifying signal may be periodically transmitted using tracking channel resources assigned to the first device.

In any of the examples, the identifying signal may be transmitted in the standby state and in absence of a paging message from the wireless communications network.

In any of the examples, the identifying signal may be transmitted to a plurality of serving transmission points, using the same DCID, as the first device moves through respective zones covered by each of the plurality of serving transmission points.

In any of the examples, the DCID may be received from a first serving transmission point, and at least one transmission of the identifying signal may be transmitted to a second serving transmission point using the same DCID.

In any of the examples, the first and second serving transmission points may belong to a same hypercell, and the DCID associated with the first device may be unique to the first device within the same hypercell.

In some example aspects, the present disclosure describes an apparatus including: a communications interface for communicating with a wireless communications network; and a processor coupled to the communications interface. The processor is configured to execute computer-readable instructions that, when executed by the processor, cause the apparatus to: receive, from a serving transmission point, a device connection identifier (DCID) associated with the apparatus in an active state; and in a standby state: periodically transmit, to the same or different serving transmission point, an identifying signal that identifies the apparatus using the DCID, to synchronize the apparatus with the wireless communications network.

In any of the examples, the processor may be further configured to execute the computer-executable instructions to cause the apparatus to: receive, by the apparatus in the standby state, synchronization information; and synchronize the apparatus with the wireless communications network using the synchronization information.

In any of the examples, the DCID assigned to the apparatus in the active state may be retained by the apparatus in the standby state, and may be further retained by the apparatus in other operational states.

In any of the examples, the identifying signal may be periodically transmitted using tracking channel resources assigned to the apparatus.

In any of the examples, the identifying signal may be transmitted in the standby state and in absence of a paging message from the wireless communications network.

In any of the examples, the identifying signal may be transmitted to a plurality of serving transmission points, using the same DCID, as the apparatus moves through respective zones covered by each of the plurality of serving transmission points.

In any of the examples, the DCID may be received from a first serving transmission point, and at least one transmission of the identifying signal may be transmitted to a second serving transmission point using the same DCID.

In any of the examples, the first and second serving transmission points may belong to a same hypercell, and the DCID associated with the apparatus may be unique to the apparatus within the same hypercell.

In some example aspects, the present disclosure describes a system, including a wireless device and a first serving transmission point. The wireless device is configured to: receive a device connection identifier (DCID) associated with the wireless device in an active state; and in a standby state: transmit, to the first serving transmission point, an identifying signal that identifies the wireless device using the DCID. The first serving transmission point is configured to: receive, from the wireless device that is in the standby state, the identifying signal; and provide synchronization information to the wireless device. The wireless device is further configured to: receive the synchronization information; and synchronize with a wireless communications network using the synchronization information.

In any of the examples, the system may further include a second serving transmission point. The second serving transmission point may be configured to: transmit the DCID to the wireless device that is in the active state. The wireless device may be further configured to: in the active state, receive the DCID from the second serving transmission point; and retain the DCID in the standby state.

In any of the examples, the identifying signal may be transmitted by the wireless device in the standby state and in absence of a paging message from the wireless communications network or from the first serving transmission point.

In any of the examples, the identifying signal may be transmitted by the wireless device using tracking channel resources assigned to the wireless device.

BRIEF DESCRIPTION OF THE DRAWINGS

Reference will now be made, by way of example, to the accompanying drawings which show example embodiments of the present disclosure, and in which.

DETAILED DESCRIPTION

The structure, manufacture and use of example embodiments are discussed in detail below. The specific examples discussed are merely illustrative of specific ways to make and use embodiments of the invention, and do not limit the scope of the invention.

Figure 1:
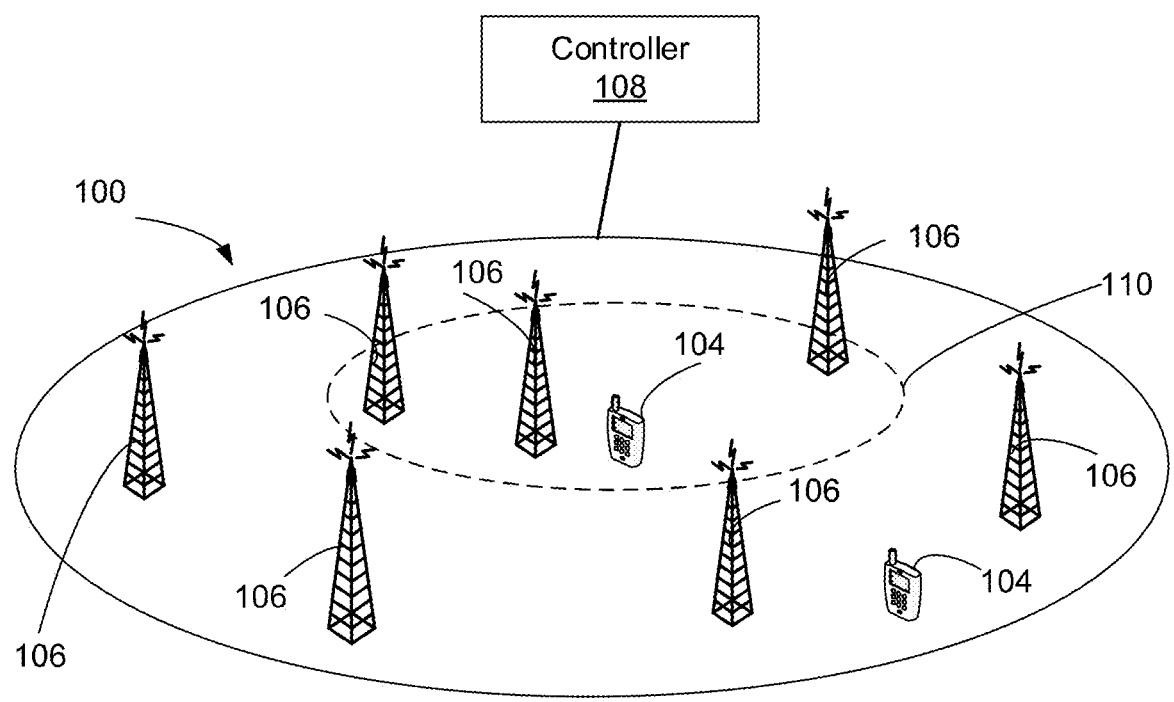
FIG. 1 illustrates an example of a wireless communications network according to example embodiments.

FIG. 1 illustrates a wireless communications network 100 to which the paging procedures described herein can be applied. The communications network 100 is a user equipment (UE)-centric network 100 which employs an air interface designed to support non-cellular based wireless communications. In example embodiments, network communications are organized around a connection identifier, such as a Dedicated Connection Identifier (DCID), which is assigned to a device or UE 104. The UE 104 may have different operating states with different sets of functionality in each state. At least some degree of connectivity to the network 100 is supported in each operating state, such that the UE 104 maintains its DCID and its connection to the wireless communications network 100. As a result, if the network 100 has data to send to a particular target UE 104, a paging message containing the DCID of the target UE 104 is sent during a listening occasion of the target UE 104. Overhead in the network 100 is reduced because the UE 104 is not required to re-establish a connection to the network as part of the paging process. The DCID also may be shorter than other identifiers, such as an International Mobile Equipment Identity (IMEI) or International Mobile Subscriber Identity (IMSI), used in existing paging processes. In example embodiments, the location of the UE 104 relative to a number of transmission points may be tracked, and the paging message may be sent by a single transmission point 106 which is selected to serve the UE 104. Because a further exchanging of messages is not required to complete the paging process, in some embodiments, the paging message may also contain the data intended for the target UE 104.

In an example embodiment, the communications network 100 of FIG. 1 includes a plurality of transmission points (TPs) 106 and a cloud processor or controller 108 in communication with the TPs 106. The TPs 106 communicate with a plurality of UEs 104. The TPs 106 may include any component or network node capable of providing wireless access by establishing uplink and/or downlink connections with the UEs 104, such as a base transceiver station (BTS), a NodeB, an evolved NodeB (eNB), a femtocell node, a lower power node, or other wirelessly enabled devices. The UEs 104 may include any component capable of establishing a wireless connection with the TPs 106. In an embodiment, the UE 104 can be a mobile phone, a sensor, a smart phone, a tablet, a computer, a wireless transmit/receive unit (WTRU), or other wirelessly enabled device. The TPs 106 may be connected to controller 108 via a backhaul network (not shown). The backhaul network may be any component or collection of components that allow data to be exchanged between the TPs 106 and the controller 108 and/or a remote end (not shown). In some embodiments, the network 100 may include various other wireless devices, such as relays. The controller 108 may be any type of data processing system capable of performing the processes disclosed below and capable of communication with other devices. In some embodiments, one of the TPs 106 may operate as the network controller 108.

In the network 100, the TPs 106 are not associated with a conventional cell. Rather, the controller 108 organizes the TPs 106 into logical entities or hypercells 110. In one embodiment, each UE 104 is assigned to a hypercell 110 and is assigned a unique DCID. The UE 104 may move freely within an area serviced by a single logical entity without acquiring a new DCID. Each TP 106 monitors signal strengths for any UE 104 detectable by the TP 106 and sends this data to the controller 108. The controller 108 creates a logical entity or determines the identity of a logical entity to be assigned to serve each UE 104 according to the signal strengths measured by the TPs 106. This determination can be performed dynamically in some embodiments. In some examples, the controller 108 assigns a logical entity ID (also referred to as a hypercell ID) to the logical entity for the hypercell 110 and assigns a DCID to each UE 104.

In some examples, the controller 108 selects one of the TPs 106 in the hypercell 110 to serve and provide network access to a UE 104. In an embodiment, the controller 108 selects the TP 106 based on relative signal strengths of the UE 104 at each of the TPs 106 in the logical entity 110, or the loads of each TP 106 in the hypercell 110, or a combination of relative signal strengths and loads. In other embodiments, other selection criteria can be used. In an embodiment, the controller 108 dynamically reassigns a new TP 106 in the hypercell 110 to serve the UE 104 based on changes to the signal strength of the UE 104 at each TP 106 in the hypercell 110. The change in signal strength may be due to UE mobility or to other factors. In an embodiment, the controller 108 can enable or disable one or more TPs 106 within a hypercell 110 to reach a tradeoff between the service quality provided to all covered UEs 104 and energy saving criteria. In an embodiment, the TPs 106 assigned to a hypercell 110 may be changed dynamically by the controller 108 according to changes in network conditions. In networks 100 which support coordinated multi-point (CoMP) transmission, multiple TPs 106 in a hypercell 110 may operate jointly as a virtual transmission point for a UE 104.

Figure 2:
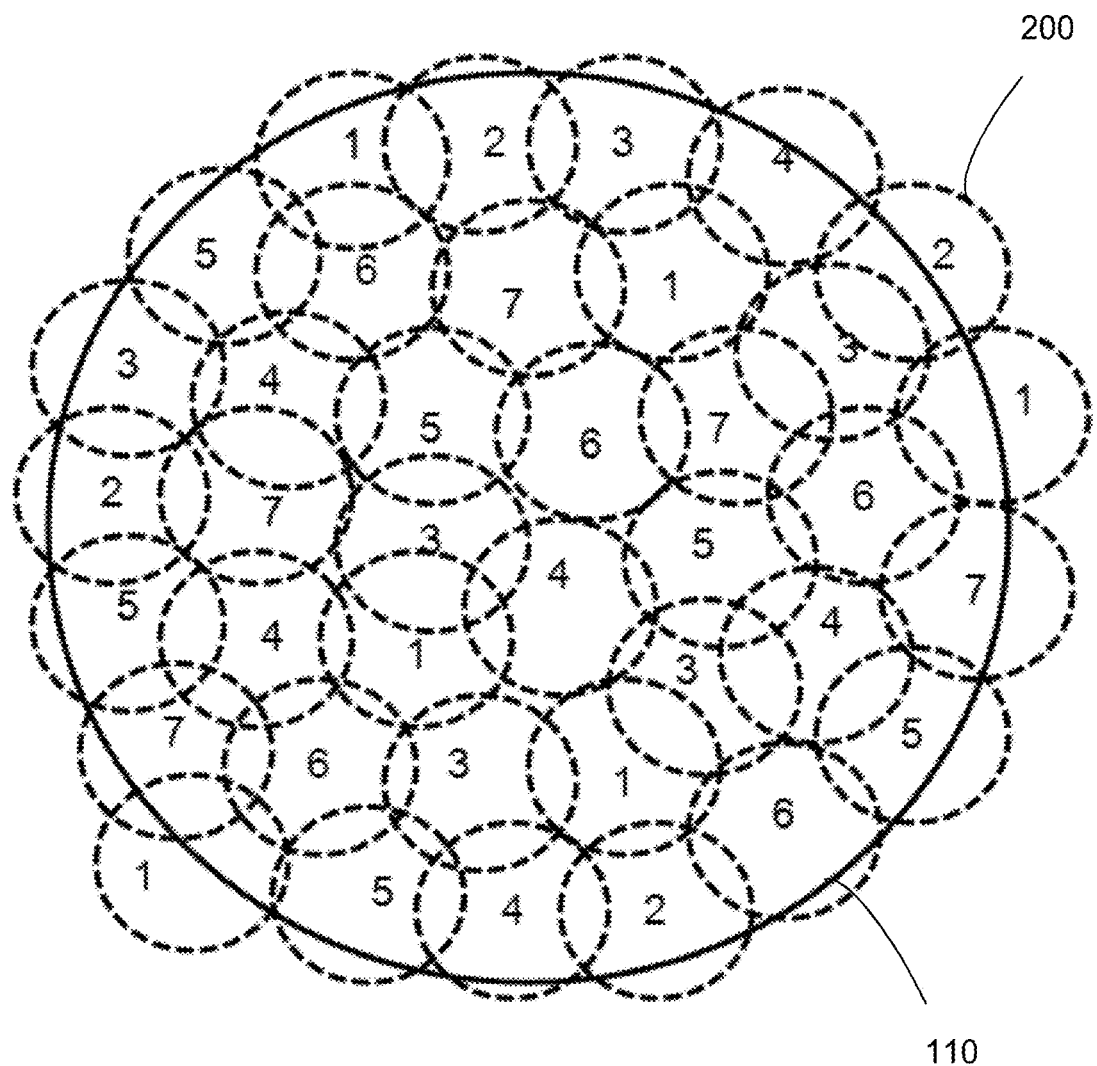
FIG. 2 illustrates an example of a logical entity or hypercell of a network of FIG. 1.

FIG. 2 illustrates a hypercell coverage area associated with hypercell 110 (depicted with an outlined circle). In at least some example embodiments, the TPs 106 (not shown in FIG. 2) of hypercell 110 are associated with different zones 200, with at least some TPs 106 that do not have common coverage areas within a hypercell 110 being assigned to common zones. In this regard, FIG. 2 illustrates hypercell 110 divided into zones 1-7; each zone includes multiple TPs 106 that are located in geographically separated regions or areas. Such a configuration can facilitate the reuse of resources in different areas of hypercell 110.

In example embodiments, the network 100 is configured to support different operating states for the UE 104, with each operating state supporting different levels of UE functionality. In particular, in one example, the UE 104 is configured to transition between two different states, namely an "active" state and an energy economizing "ECO" or "standby" state. In example embodiments, the active state includes the UE 104 performing operations to send, receive, or send and receive data from the network 100 for one or more applications or services supported by the UE 104. A reduced set of UE functionality is supported in the standby state compared to the set of UE functionality supported in the active state. In at least some example embodiments, network resources used to support the UE 104 while it is operating in a standby state are less than the resources required when the UE 104 is in an active state. In both states, at least some degree of connectivity to the network 100 is supported. The UE 104 maintains an always-on connection to the wireless communications network 100, and in particular the UE 104 stores and retains the assigned DCID during different operating states including the standby state. As a result of retaining the DCID, the UE 104 may perform a number of actions in a standby operating state such as, but not limited to, receiving paging messages, receiving data, and sending acknowledgements, as described below. The UE 104 may also perform other actions to update location or synchronization information with the network 100. These actions permit the transition of the UE 104 from a standby operating state to an active operating state without having to obtain a new DCID identifier.

The DCID for a UE 104 may be assigned during an initial access procedure that is supported by UE 104 in the active state. In an example initial access procedure, the UE 104 searches for a synchronization signal associated with the logical entity for the hypercell 110; the UE 104 accesses the hypercell 110 of network 100 via a pre-defined default frame structure; the UE 104 obtains downlink (DL) synchronization via a sync channel; and the UE 104 uses Physical Random Access Channel (PRACH) for initial access. The network controller 108 authenticates the UE 104 and assigns a UE DCID. At the conclusion of the initial access procedure, the UE 104 is provided with a hypercell ID, a UE DCID, and a UE-specific sequence that is associated with the UE DCID (which may, for example, be a Zadoff-Chu sequence). In example embodiments, for uplink communications, a UE 104 can be identified by the network 100 based on the UE-specific sequence used by the UE 104 in an uplink communications channel and the DCID which is associated with or related to that UE-specific sequence. The DCID for the UE 104 may be used by multiple signaling, control and data channels including, for example, a tracking channel (TC) and a physical downlink control channel (PDCCH). Systems and methods for initial access procedures and for UE connection and identification in the network 100 are described in further detail in the applicant's application No. 62/141,483, filed Apr. 1, 2015, and entitled System and Method for a Tracking Channel, and application No. 62/213,450, filed Sep. 9, 2015, and entitled System and Method for Channel Security, both of which are herein incorporated by reference.

Figure 3:
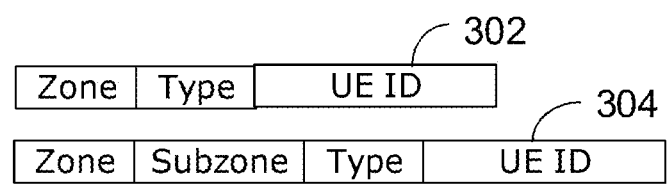
FIG. 3 illustrates an example of a DCID associated with a user equipment device according to example embodiments.

In example embodiments, the DCID assigned to a UE 104 within the hypercell 110 may contain multiple fields such as a zone identifier (zone ID), a UE type, and a UE identifier (UE ID). An example of such a multi-field DCID record 302 is illustrated in FIG. 3. The UE type may identify or group the device according to the type of device, the type of data or traffic associated with the device, or both. For example, a stationary device which does not transmit or receive a large amount of data may be designated as a sensor type of device. The UE ID may consist of a number or other identifier assigned to or associated with the UE 104 to identify the UE 104 in the hypercell 110. The zone ID indicates the zone of the hypercell 110 to which the UE is assigned, as described above. In example embodiments, the DCID includes both a zone ID and a subzone ID as illustrated in FIG. 3 by DCID record 304. The subzone ID may be used to indicate a smaller geographical area and subset of TPs 106 within a zone.

As noted above, once a UE 104 has initially accessed the network 100, the UE 104 may enter a standby state. Periodically during the standby state, the UE 104 may perform one or more tasks that require communication with the network 100. In example embodiments, at least some of the standby communications use tracking channel network resources assigned to the UE 104. In example embodiments, the UE 104 periodically transmits an identifying signal while in its standby state, which contains or is associated with the DCID which has been assigned to the UE 104. In some embodiments, the signal transmitted by the UE 104 includes the UE-specific sequence (for example a Zadoff-Chu sequence) which is associated with or related to the DCID, as described above, and is transmitted using the tracking channel resources assigned to the UE 104. The UE 104 may periodically transmit the signal to maintain or update synchronization or power control within the network 100, maintain or update authentication and security, or provide a status report to the network 100.

As a result, the network 100 may track the UE 104 even while the UE 104 is operating in its standby state and determine a serving TP 106 or a set of serving TPs 106 which are capable of serving the UE 104. The network 100 also may update a zone, a subzone, a type, or a combination of the zone, subzone and type for the UE 104 and a new DCID may be assigned. A new DCID may also be assigned to the UE 104 for security purposes either periodically or in response to other triggers or conditions. The assigned DCID is retained by the UE 104 during the standby operating state and during transitions between the standby state and other operational states, including transitions between the standby and active states. The DCID assigned to the UE 104 and the serving TP 106, or set of serving TPs 106, is also retained by the network 100 for as long as the network 100 is able to continue tracking the UE 104, regardless of whether the UE 104 remains in the active state. Thus, the UE 104 maintains the always-on connection to the wireless communications network 100. Accordingly, in at least some examples, the assigned DCID can be retained by the network 100 and the UE 104 for a period of time that includes at least one active state duration and a subsequent standby state duration of the UE 104.

Examples will now be described of how paging messages for a UE 104 are processed according to example embodiments. In example embodiments, paging messages are messages that can be sent to a UE 104 that is in a standby state to notify the UE 104 that the network 100 has downlink data to transmit to the UE 104. In some examples, the paging message includes network resource allocation information that instructs the UE 104 to receive data using the allocated network resources, which may require the UE to transition from its standby state to an active state. In some examples, the paging message includes appended data that the UE 104 can receive using the same network resources as the paging message without transitioning to an active state.

Figures 4A, 4B:
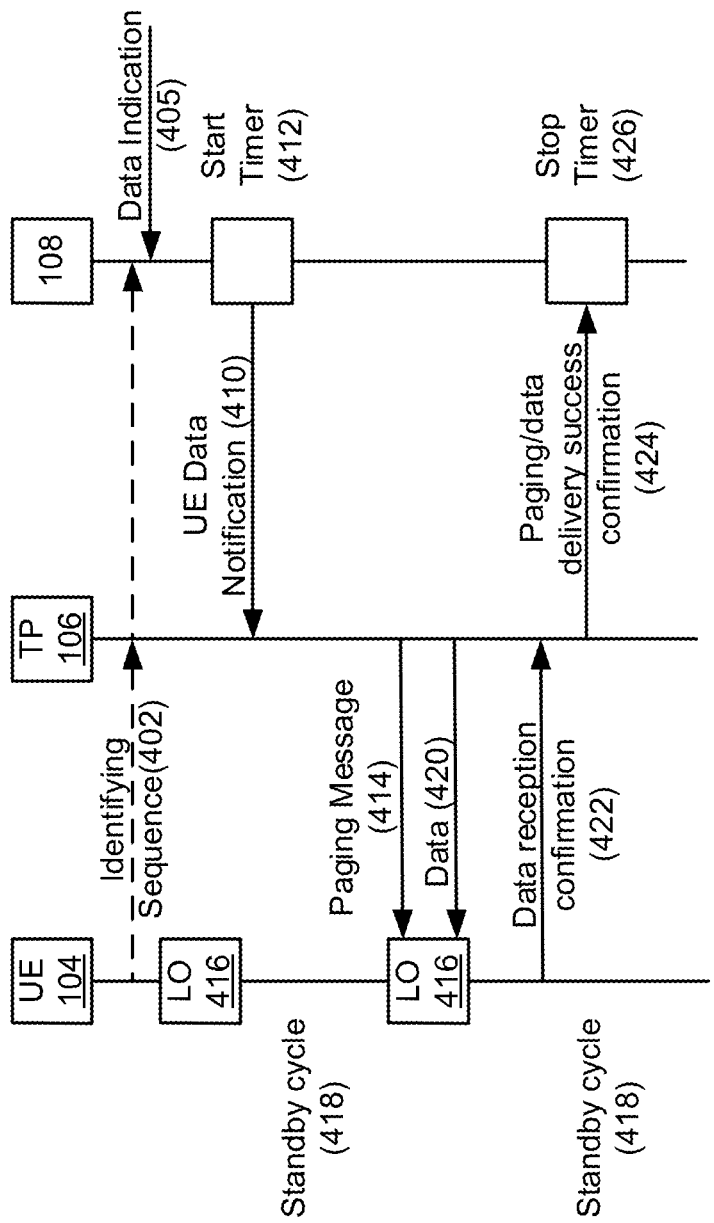
FIG. 4A is a schematic flowchart diagram illustrating a paging method according to example embodiments.
FIG. 4B illustrates an example of a paging message used in the method of FIG. 4A according to example embodiments.

In this regard, FIG. 4A is a signaling diagram that illustrates methods for processing paging messages as performed by target UE 104, a network node (TP 106) and network controller 108. In FIG. 4A, UE 104 has transitioned to a standby state. While in the standby state, as previously discussed, UE 104 periodically sends an identifying signal (action 402) to a TP 106 of the network 100 using a tracking channel. In an example embodiment, the identifying signal is a sequence that is associated with the DCID previously assigned to the UE 104 by the network controller 108 during a prior active state of the UE 104. After the TP 106 receives the identifying signal, the TP 106 sends the network controller 108 a message that includes the identifying signal (or other information that identifies the UE 104) as well as information that identifies the TP 106 and the network controller 108 uses this information to track the location of the UE 104.

While in the standby state, UE 104 listens for paging messages from the network 100. In particular, the UE 104 periodically performs an operation referred to herein as a listening occasion (LO) 416 during which the UE 104 monitors, for a predetermined duration, predetermined network resources allocated to it for paging messages and other messages. The predetermined network resources may, for example, include a time/frequency allocation associated with a tracking channel or other channel such as a dedicated paging channel. One or more of the actions 402, 416 may be performed by the UE 104 at the same time, or at different times. Each of the actions 402, 416 may be performed periodically with the same or different standby cycle time intervals 418.

In the example embodiment of FIG. 4A, a paging sequence starts when the network controller 108 receives an indication (action 405) that a data source connected to the network 100 has data to send to the target UE 104. The indication may include the DCID which has been assigned to the target UE 104, or the network controller 108 may alternatively determine the DCID of the target UE 104 in some other way. Based on the periodic identifying signals that the network 100 has been receiving from target UE 106, the network controller 108 tracks the current location of the UE 104 even while the UE 104 is in its standby state, thus allowing the network controller 108 to determine a serving TP 106 (Action 324) for the target UE 104. The serving TP 106 is a TP 106 which has been selected by the network 100 to send or receive data from the UE 104 based on various criteria such as, but not limited to, signal strengths and traffic loads. The serving TP 106 for a particular UE 104 may be selected or determined on a periodic basis either separate from, or as part of, the paging method of FIG. 4. In one embodiment, the serving TP 106 may be determined based on the TP 106 with the best channel to the UE 104. The best channel may be determined based on the relative signal strengths of the target UE 104 at each of the TPs 106 in the logical entity 110 and/or the loads of each TP 106 in the hypercell 110. In example embodiments, the serving TP may be a virtual transmission point consisting of multiple TPs 106 in the network 100 which operate jointly to transmit data to the target UE 104.

Once a serving TP 106 has been determined, the network controller 108 generates and sends a UE data notification message to the serving TP 106 (Action 410) instructing the serving TP 106 to send a paging message to the target UE 104. In one example, the data notification message sent from the network controller 108 to the serving TP 106 includes: the DCID for the target UE 104; a wireless resource allocation (RA) or other scheduling information that is to be used by the serving TP 106 to send data to the target UE 104; and the data that is to be sent to the target UE 104 (or information that identifies the data so that the TP 106 can retrieve the data). In an example embodiment the network controller 108 starts a paging timer (action 412) for the paging process when it sends the data notification.

The data notification may be sent from the network controller 108 to the serving TP 106 through the backhaul network. If the serving TP 106 also operates as the network controller 108, the data notification is provided from a network controller function to a paging function within the serving TP 106. If the network controller 108 is part of one TP 106 which is not the serving TP 106, the data notification for the target UE 104 may be sent from one TP 106 to the second, serving TP 106.

Once the serving TP 106 receives the data notification (action 410) the serving TP 106 generates and sends a corresponding paging message (action 414) addressed to the target UE 104. FIG. 4B illustrates an example paging message 450, which includes the DCID 302 of the target UE 104 and the resource allocation (RA) 452 that is going to be used to send the data associated with the paging message. The paging message 450 may be sent by the TP 106 (action 414) during paging intervals which coincide with the listening occasions (LO) 416 of the target UE 104. In example embodiments, the paging interval may be an integer multiple of the listening occasion interval of the target UE 104, such that the paging interval coincides with at least one listening occasion for the UE 104. The paging intervals and listening occasion intervals may be predetermined for the network 100 and TPs 106 and configured for the UE 104 when the UE 104 initially accesses the network 100.

In the example paging message 450 shown in FIG. 4A, the UE identifying information includes the entire DCID. However, in some embodiments, the paging message 450 may include only a portion of the DCID that contains sufficient information to identify the target UE 104 within the hypercell 110.

After receiving the paging message 450, the UE 104 processes the resource allocation information 450 that is included with the message to determine what network resources will be used to transfer data that is associated with the paging message, and then proceeds to receive the data, which is sent by the serving TP 106 (action 420) using the specified network resources. In some embodiments, the UE 104 may transition from the standby state to the active state to receive the data from the network 100 in association with the DCID. In one embodiment, the UE 104 only wakes up or operates sufficiently to perform one or more of the above actions (402, 414, 420) but the UE 104 does not necessarily transition from the standby state to the active state.

In example embodiments, the paging method of FIG. 4A may further include a data reception confirmation message (action 422) that is sent from the target UE 104 to the serving TP 106 to confirm receipt of the paging message. The serving TP 106 may then confirm successful delivery of the paging message to the network 100 by sending a confirmation notification to the controller 108 (Action 424). Upon receipt of this confirmation notification, the network controller 108 stops the paging timer (action 426) to end the paging process.

Figure 5A:
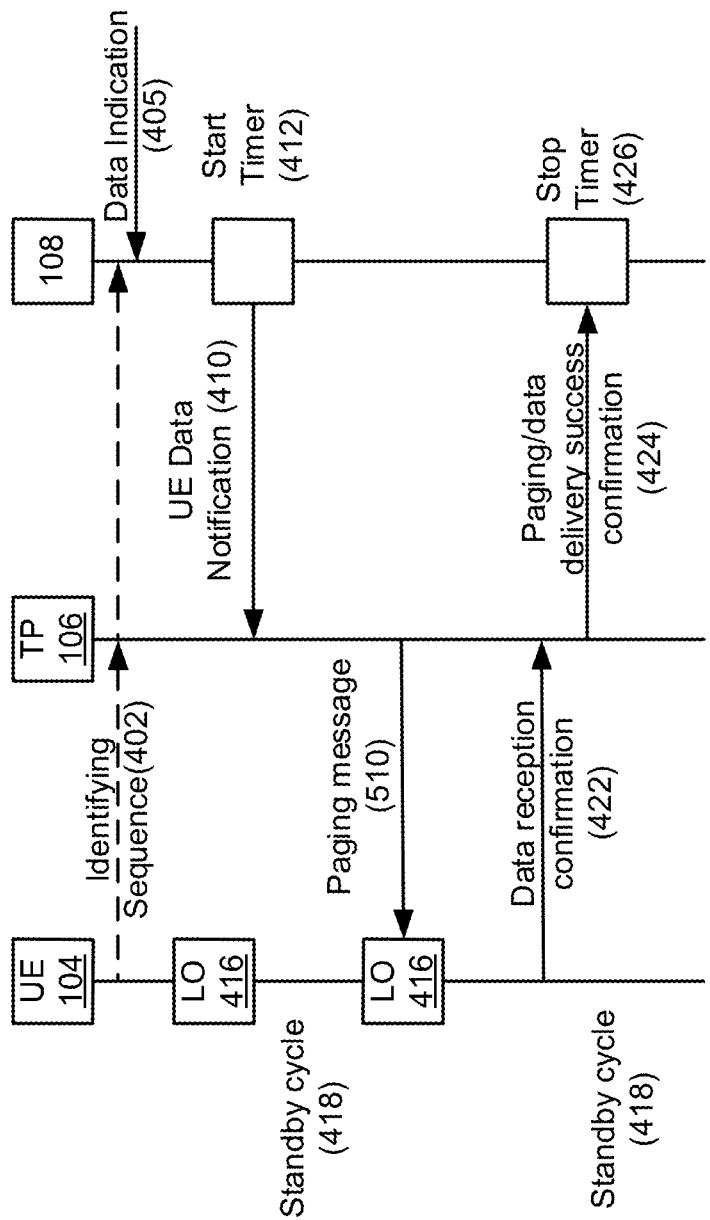
FIG. 5A is a schematic flowchart diagram illustrating a paging method according to example embodiments.
Figure 5B:
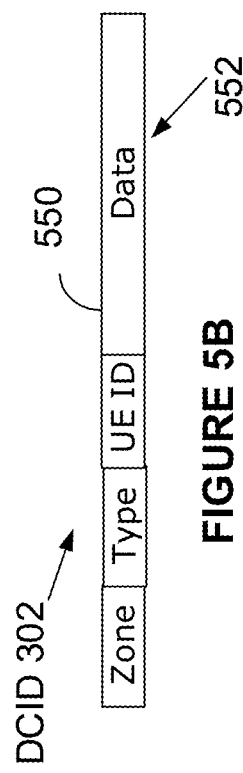
FIG. 5B illustrates an example of a paging message used in the method of FIG. 5.

FIG. 5A illustrates another example method for processing a paging message which is similar to that shown in FIG. 4A and described above with the exception of differences that will be apparent from the following description. As illustrated in FIG. 5A, other embodiments may be suitable for use when only a small amount of data is intended for the target UE 104. FIG. 5B illustrates a paging message 550 for use in the method of FIG. 5. Similar to previously discussed paging message 450, the paging message 550 includes an identifier for the target UE 104 (for example DCID 302). However, instead of having resource allocation information, the paging message 550 includes the actual downlink data 552. Accordingly, in the method of FIG. 5A, the paging message 550 sent by the TP 106 (action 510) includes the DCID (or shortened identifier) of the target UE 104 together with the data 552 at the same time-frequency (TF) resource. In some embodiments, such as for a short data packet as illustrated in the example of FIG. 5A, the paging message with data may be received by the UE 104 while remaining in a standby state.

In some example embodiments, the network 100 is configured to support both the paging method of FIG. 4A and the paging method of FIG. 5. In such configurations, the network controller 108 may be configured to determine, based on one or more criteria, whether the data for a paging message is best sent using the same network resources as the paging message (as in FIG. 5) or using different network resources (as in FIG. 4). Such criteria could include, for example, the size of the data to be sent, the available network resources, and the UE type.

As illustrated in FIGS. 4 and 5, a paging interval timer may be started (action 412) in the network when a notification (action 410) is sent to a serving TP 106. In one embodiment, the timer is maintained by the controller 108. If the timer expires before confirmation of delivery is received for the paging message and data, further actions may be taken. In one embodiment, additional paging messages may be sent for the target UE 104 at subsequent paging intervals. In some embodiments, the paging message includes a relay flag and, after a failed paging attempt, the relay flag is turned on. The relay flag provides an indication to the UEs 104, other than the target UE 104, that the paging message should be relayed or retransmitted in the network 100. The relay flag may be included with the notification provided by the network 100 to the TP 106 and included with the paging message sent by the TP 106.

Figure 6A:
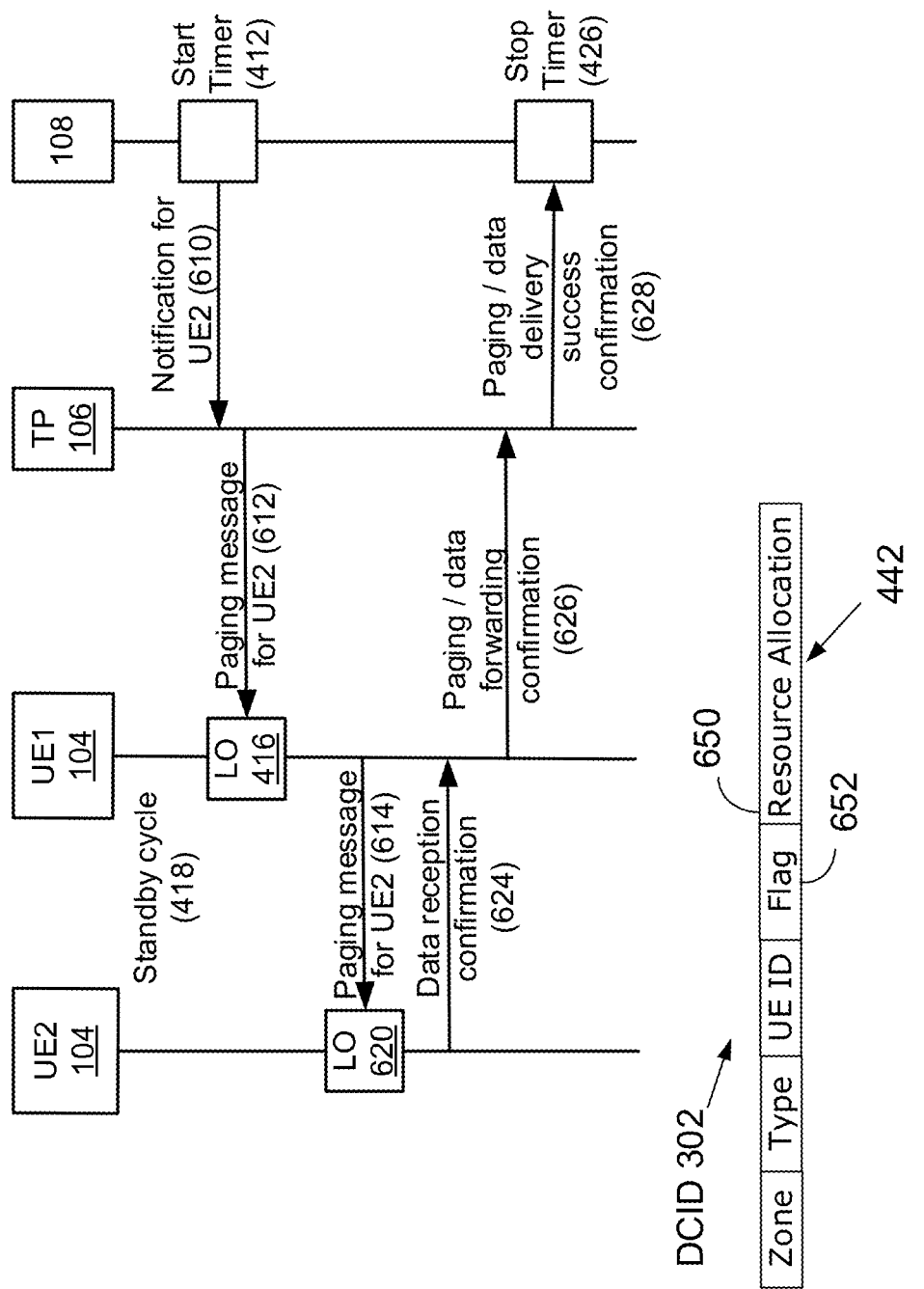
FIG. 6A and FIG. 6B are schematic flowchart diagrams illustrating a paging method according to example embodiments.
Figure 6B:
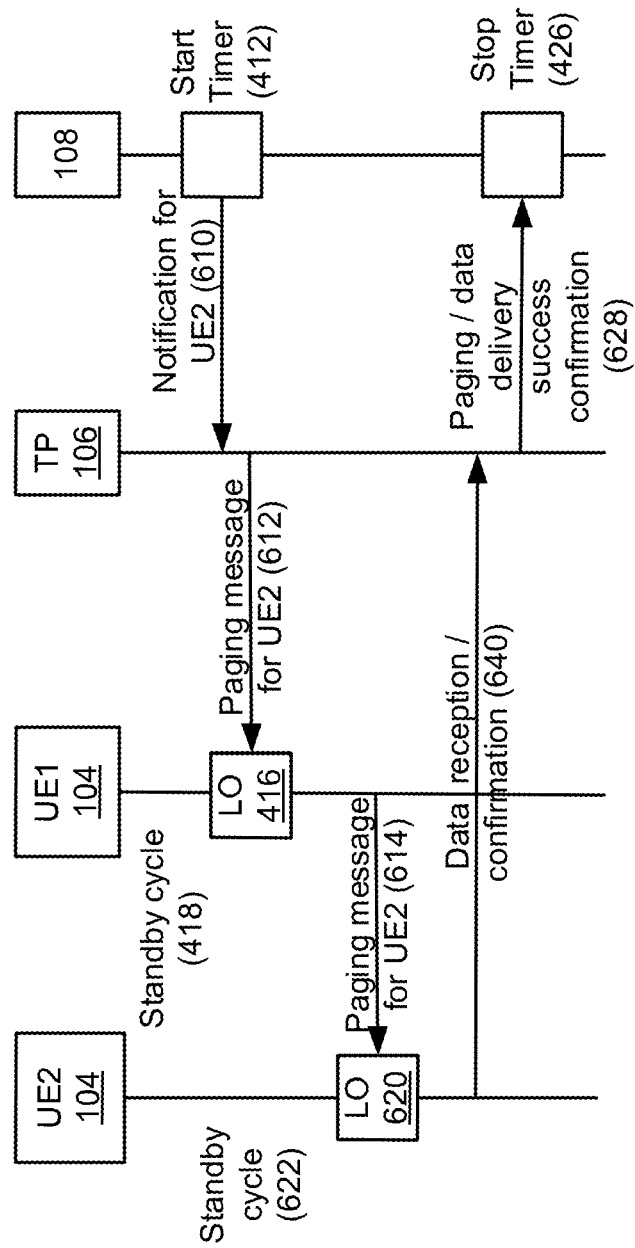

In this regard, FIGS. 6A and 6B illustrate paging methods in which one UE1 104 is used as an intermediate device to relay a paging message to a second UE2 104. The methods of FIGS. 6A and 6B are similar to those described above in respect of FIGS. 4 and 5 with the exception of differences that will be apparent from the following description. In the example of FIG. 6A, network controller 108 has determined that a paging message is required to be sent to UE2 104, but has determined that the last transmission hop for the paging message will be a peer-to-peer relay from another user equipment device to UE2 104. The network controller 18 may, for example, make the determination that an intermediate relay is required as a result of a previously failed attempt to send a paging message to target UE2 104. Alternatively, the network controller 18 may make the determination without a previously failed paging attempt based on prior information that the network is tracking in respect of UE2 104. In an example embodiment, the network controller determines, based on tracked information in respect of UE2 104, a suitable TP 106 to use to deliver the paging message, and then sends a paging notification (action 610) to the TP 106. In an example embodiment, the paging notification includes the DCID for the target UE2 104, an indication of the data that is to be sent, resource allocation information for the data transfer if required, and a relay indicator such as a flag that indicates that the paging message is to be relayed by an intermediate device. Upon receiving the paging notification (action 610), the serving TP 106 generates a paging message as indicated by reference 650 in FIG. 6A. The paging message 650 is similar to paging message 450 discussed above in that it includes the DCID 302 of the target UE2 104 and resource allocation information 442. However, the paging message 650 also includes a relay indicator 652, which may for example be a binary flag, that is set to indicate that the paging message 652 is intended to be relayed by an intermediate wireless communication device. The serving TP 106 then transmits the paging message 650 (action 612) over wireless network 100. In an example embodiment, paging message 650 is transmitted in a tracking channel or other channel such as paging channel that devices other than UE2 104 have access to.

In the example of FIG. 6A, a wireless device UE1 104 monitoring the channel on which paging message 650 is sent receives the paging message 650 during a LO 416. After comparing the UE ID in the DCID 302 from the paging message 650, and determining that this UE ID does not correspond to its own UE ID, the UE1 104 checks the relay indicator 652. If this relay indicator 652 is "on" and thus indicates that the paging message 650 should be relayed, the UE1 104 retransmits the paging message 650 (action 614) for possible receipt by the target UE2 104. The paging message 650 may be received by the target UE2 104 during a LO 620 which occurs periodically during the standby cycle 622 of the target UE2 104. UE1 104 may use the network tracking channel for sending the paging message 650 or it may use a dedicated peer-to-peer channel.

Similar to the example paging method of FIG. 4A, the paging message 650 can include resource allocation information 442 that instructs the target UE2 104 what resources will be used to transmit the data associated with the paging message 650. In some example embodiments, the intermediate device UE1 104 may also be used to relay such data; however in some embodiments the target UE2 104 may receive the data directly from TP 106. In some example embodiments, the paging message 650 itself includes data 552 (as in the example of FIG. 5). The relay indicator 652 may thus be used to increase the success rate in paging and delivering data to the target UE 104. In some embodiments, the relay indicator may be turned on for the initial paging of the target UE 104. In some embodiments, the relay indicator may be turned on only after one or more attempts at paging the target UE 104 have failed.

In the example of FIG. 6A, after receipt of the paging message 650 and data, the target UE2 104 sends a confirmation (action 624) to confirm receipt of the paging message to the intermediate UE1 104. The UE1 in turn sends a confirmation (action 626) to confirm receipt to serving TP 106. The TP 106 then sends a confirmation (action 628) to the network 100 to confirm successful delivery of the data and paging message, after which the timer may be stopped (action 426). In other embodiments, as illustrated in FIG. 6B, the target UE2 sends a confirmation 640 directly to the TP 106 to confirm receipt.

In some embodiments, before relaying the paging message for the target UE2 104, the intermediate UE1 104 may determine whether the DCID 302 in the paging message 650 has the same zone, or the same zone and subzone, as UE1 104. If the zone or zone and subzone are the same, and the relay indicator is on, the UE1 retransmits the paging message 650. However, if the zone or zone and subzone do not match, or the relay indicator is off, UE1 104 ignores the message. In a further embodiment, the UE1 may determine whether to retransmit the paging message based on differences between the UE ID for the UE1 and the UE ID for the target UE2. In an example embodiment, the UE IDs which are assigned to the UEs 104 are configured so that a binary distance between the UE ID numbers indicates, e.g. is proportional to, a geographical or physical distance between the UEs 104. Thus, if UE1 and UE2 are stationary devices, such as sensor devices, the assigned UE IDs may represent a geographical distance between the UEs. The UE IDs may also be configured in this manner for UEs 104 which are stationary or moving within a small area, such as the mobile devices of users attending a concert or event. After the UE1 compares the UE ID in the DCID from the paging message intended for UE2, the UE1 may determine whether to relay the message based on the differences in the UE IDs. In one example, small differences in the UE IDs may indicate that there is a small relative distance between the UE1 and UE2. Based on this small difference and the relay flag being turned on, the UE1 relays or retransmits the paging message for a further chance of receipt by the UE2. In one embodiment, the differences in the UE IDs are compared to a predetermined threshold difference configured for or transmitted to the UE1. If the differences are below the threshold, and the relay flag is turned on, the first device UE1 relays or retransmits the paging message.

Figure 7:
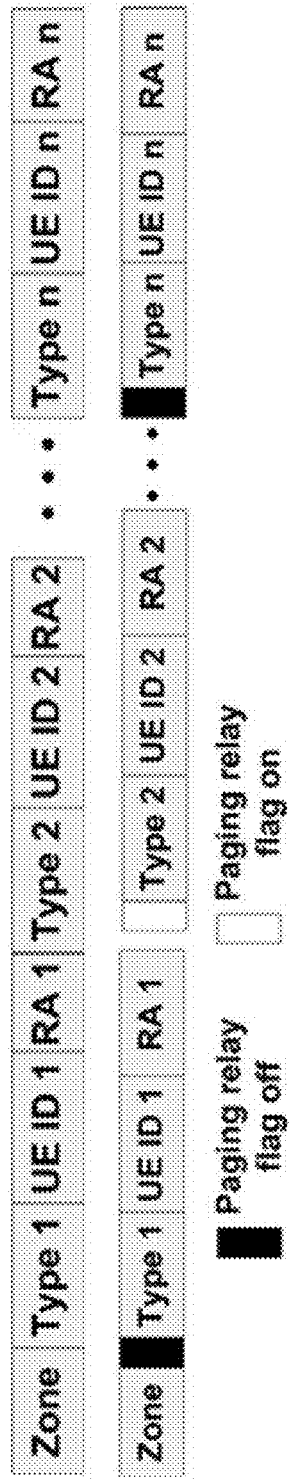
FIG. 7 is a diagram of a concatenated paging message according to example embodiments.

In any of the embodiments described above, it will be appreciated that the paging message may include information which is concatenated for multiple target UEs 104. The paging message may be concatenated for multiple target UEs 104 in a particular zone, as illustrated in FIG. 7. The paging message may include the zone ID along with the type, UE ID and resource allocation or data for each target UE 104, 1 to n. The paging message may include a relay flag, as described above, which is determined and turned on or off independently for each target UE 104. As shown in FIG. 7, the relay flag may be on for only selected UEs. Alternatively, the paging message may include one relay flag (not shown) for all target UEs 104 included within the paging message.

Figure 8:
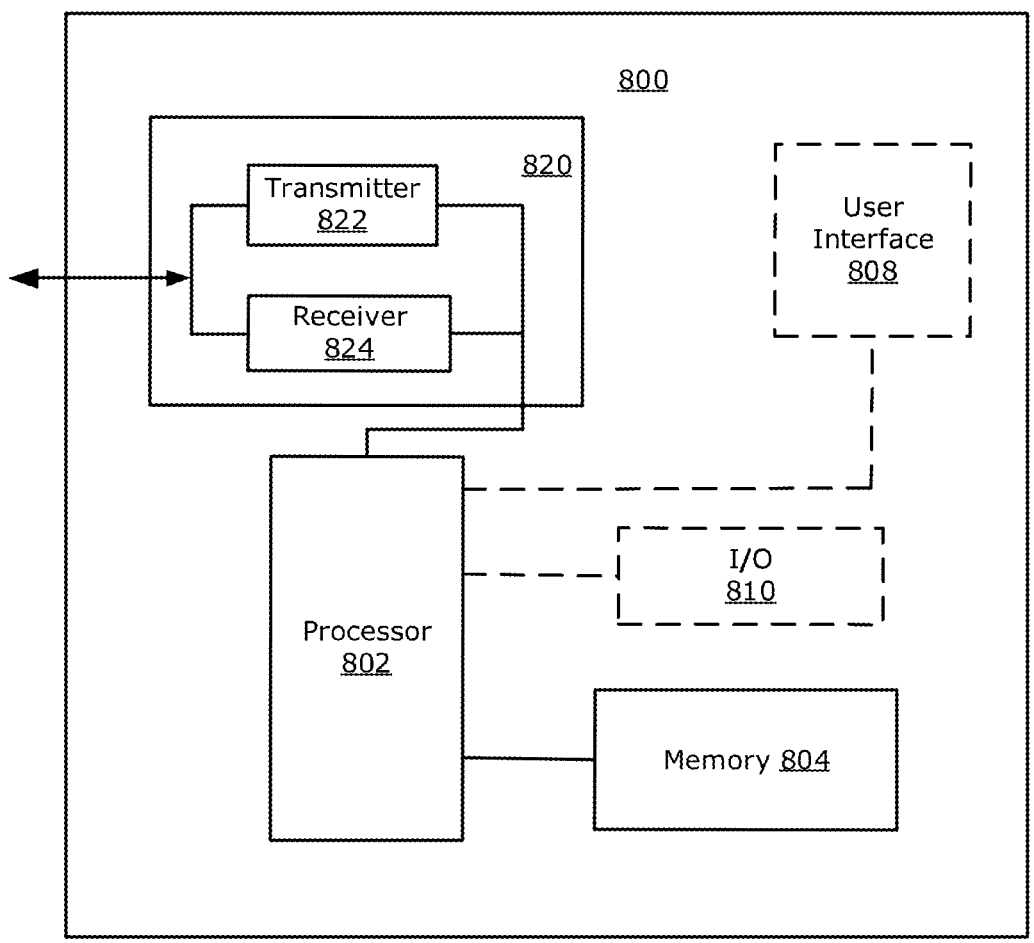
FIG. 8 is a block diagram of a wirelessly-enabled device for implementing embodiments described herein.

FIG. 8 illustrates a device 800 adapted to execute embodiments described herein. The device 800 may be a network-side device such as, but not limited to, a TP 106, controller 108, base station, relay-station, or the like. The device 800 may be a user-side device such as, but not limited to, a user equipment (UE) 104. The device 800 may include one or more processing devices 802, such as a processor, a microprocessor, an application-specific integrated circuit (ASIC), a field-programmable gate array (FPGA), a dedicated logic circuitry, or combinations thereof. The device 800 may also include a memory 804, which may include a volatile or non-volatile memory (e.g., a flash memory, a random access memory (RAM), and/or a read-only memory (ROM)). The memory 804 may consist of a transitory computer readable media such as a RAM, a ROM, an erasable programmable ROM (EPROM), an electrically erasable programmable ROM (EEPROM), a flash memory, a CD-ROM, or other portable memory storage. The memory 804 may store instructions for execution by the processing device(s) 802, such as to carry out the present disclosure. The memory 804 may include other software instructions, such as for implementing an operating system and other applications/functions. In one embodiment, the device 800 may include a user interface 808 which may include various inputs/outputs 810 such as a display, keypads, buttons, speaker, microphones or other inputs or outputs.

The device 800 may include one or more network interfaces 820 for sending and receiving data over the network 100. The network interface(s) 820 may include a transmitter 822, a receiver 824 and any component or collection of components that allow the device 800 to interact and/or communicate with another device, component, or entity. In one embodiment, the device 800 is a network-side device, such as the network controller 108. The network interface 820 may include a wired backhaul interface that allows the network controller 108 to communicate with other network-side devices, e.g., transmission points, access points, gateways, and other network controllers 108. In one embodiment, the device 800 is a network-side device, such as the TP 106. The network interface 820 may include a wired backhaul interface that allows the TP 106 to communicate with other network-side devices, e.g., neighboring transmission points, access points, controllers, gateways, etc. The network interface 820 includes a wireless communications interface to support communications with UEs 104. In some embodiments, the device 800 is configured to operate as both a network controller 108 and as a TP 106. In another embodiment, the device 800 is a user-side device such as the UE 104. The network interface 820 allows a user or a second user device to interact and/or communicate wirelessly with the UE 104.

It will be appreciated that the functions of the network interface 820 and wireless communications interface may be carried out by different transceiver or modem components including multiple transmitter, receiver and antenna components or arrays. The one or more network interfaces 820 may be configured for wired or wireless communication with a network, such as but not limited to, an intranet, the Internet, a peer to peer (P2P) network, a wide area network (WAN), local area network (LAN) and/or a mobile communications network such as a 5G, 4G LTE or other network as noted above. The network interface(s) 820 may include wired links (e.g., Ethernet cable) and/or wireless links (e.g., one or more antennas) for intra-network and/or inter-network communications.

The device 800 may be configured to communicate in accordance with a standard wireless telecommunication protocol. In some embodiments, the device 800 communicates in accordance with a long-term evolution (LTE) protocol. In other embodiments, the device 800 communicates in accordance with another protocol, such as a Wi-Fi protocol defined by Institute of Electrical and Electronics Engineers (IEEE) technical standard 802.11-2012 or 802.11ac-2013.

Although the present disclosure describes methods and processes with steps in a certain order, one or more steps of the methods and processes may be omitted or altered as appropriate. One or more steps may take place in an order other than that in which they are described, or simultaneously, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method performed by a first device, the method comprising:
   in an active state:
      performing an initial access procedure to associate the first device with a serving transmission point in a wireless communications network;
      receiving, from the serving transmission point during the initial access procedure, a device connection identifier (DCID) associated with the first device, the DCID containing multiple fields, the multiple fields of the DCID including a type field for identifying a device type of the first device, the type field providing information useable by the wireless communications network to determine network resources to be used for sending data to the first device; and
      transitioning from the active state to a standby state different from the active state;
   in the standby state different from the active state, the DCID being maintained in the standby state, the standby state supporting a reduced set of device functionality and being supported by reduced network resources compared to the active state:
      periodically transmitting, to the same or different serving transmission point, an identifying signal that identifies the first device using the DCID, to synchronize the first device with the wireless communications network;
      after synchronization, receiving or transmitting data from the same or different serving transmission point, while remaining in the standby state; and
      transitioning from the standby state to the active state, and maintaining the DCID from the standby state to the active state.

2. The method of claim 1, further comprising:
   receiving, by the first device in the standby state, synchronization information; and
   synchronizing with the wireless communications network using the synchronization information.

3. The method of claim 1, wherein the DCID is further retained by the first device in other operational states.

4. The method of claim 1, wherein the identifying signal is periodically transmitted using tracking channel resources assigned to the first device.

5. The method of claim 1, wherein the identifying signal is transmitted in the standby state and in absence of a paging message from the wireless communications network.

6. The method of claim 1, wherein, while the first device is in the standby state, the identifying signal is transmitted to a plurality of serving transmission points, using the same DCID, as the first device moves through respective zones covered by each of the plurality of serving transmission points.

7. An apparatus comprising:
   a communications interface for communicating with a wireless communications network; and
   a processor coupled to the communications interface, the processor being configured to execute computer-readable instructions that, when executed by the processor, cause the apparatus to:
   in an active state:
      perform an initial access procedure to associate the apparatus with a serving transmission point in the wireless communications network;
      receive, from the serving transmission point during the initial access procedure, a device connection identifier (DCID) associated with the apparatus, the DCID containing multiple fields, the multiple fields of the DCID including a type field for identifying a device type of the apparatus, the type field providing information useable by the wireless communications network to determine network resources to be used for sending data to the apparatus; and
      transition from the active state to a standby state different from the active state;
   in the standby state different from the active state, the DCID being maintained in the standby state, the standby state supporting a reduced set of device functionality and being supported by reduced network resources compared to the active state:
      periodically transmit, to the same or different serving transmission point, an identifying signal that identifies the apparatus using the DCID, to synchronize the apparatus with the wireless communications network;
      after synchronization, receive or transmit data from the same or different serving transmission point, while remaining in the standby state; and
      transition from the standby state to the active state, and maintain the DCID from the standby state to the active state.

8. The apparatus of claim 7, wherein the processor is further configured to execute the computer-executable instructions to cause the apparatus to:
receive, by the apparatus in the standby state, synchronization information; and
synchronize the apparatus with the wireless communications network using the synchronization information.

9. The apparatus of claim 7, wherein the DCID is further retained by the apparatus in other operational states.

10. The apparatus of claim 7, wherein the identifying signal is periodically transmitted using tracking channel resources assigned to the apparatus.

11. The apparatus of claim 7, wherein the identifying signal is transmitted in the standby state and in absence of a paging message from the wireless communications network.

12. The apparatus of claim 7, wherein, while the apparatus is in the standby state, the identifying signal is transmitted to a plurality of serving transmission points, using the same DCID, as the apparatus moves through respective zones covered by each of the plurality of serving transmission points.

13. A system, comprising a wireless device and a first serving transmission point;
wherein the wireless device is configured to:
in an active state:
perform an initial access procedure to associate the wireless device with the first serving transmission point in a wireless communications network;
receive, from the first serving transmission point during the initial access procedure, a device connection identifier (DCID) associated with the wireless device, the DCID containing multiple fields, the multiple fields of the DCID including a type field for identifying a device type of the wireless device, the type field providing information useable by the wireless communications network to determine network resources to be used for sending data to the wireless device; and
transition from the active state to a standby state different from the active state;
in the standby state different from the active state, the DCID being maintained in the standby state, the standby state supporting a reduced set of device functionality and being supported by reduced network resources compared to the active state:
periodically transmit, to the first serving transmission point, an identifying signal that identifies the wireless device using the DCID; and wherein the first serving transmission point is configured to:
receive, from the wireless device that is in the standby state, the identifying signal; and
provide synchronization information to the wireless device;
wherein the wireless device is further configured to:
receive the synchronization information;
synchronize with the wireless communications network using the synchronization information;
after synchronization, receive or transmit data from the first serving transmission point, while remaining in the standby state; and
transition from the standby state to the active state, and maintain the DCID from the standby state to the active state.

14. The system of claim 13, further comprising a second serving transmission point;
wherein the second serving transmission point is configured to:
transmit the DCID to the wireless device that is in the active state; and
wherein the wireless device is further configured to:
in the active state, receive the DCID from the second serving transmission point; and
retain the DCID in the standby state.

15. The system of claim 13, wherein the identifying signal is transmitted by the wireless device in the standby state and in absence of a paging message from the wireless communications network or from the first serving transmission point.

16. The system of claim 13, wherein the identifying signal is transmitted by the wireless device using tracking channel resources assigned to the wireless device.

17. The method of claim 1, further comprising:
while in the standby state, wirelessly communicating with the same or different serving transmission point, using tracking channel resources assigned to the first device in the active state.

18. The method of claim 1, wherein the first device is designated the device type based on amount of data transmitted or received by the first device.

19. The method of claim 1, further comprising:
while in the standby state:
receiving a paging message from the wireless communications network, the paging message including: a relay indicator field indicating the paging message is intended to be relayed; and a target DCID from the DCID associated with the first device; and
retransmitting the received paging message.

* * * * *